Patented Mar. 26, 1940

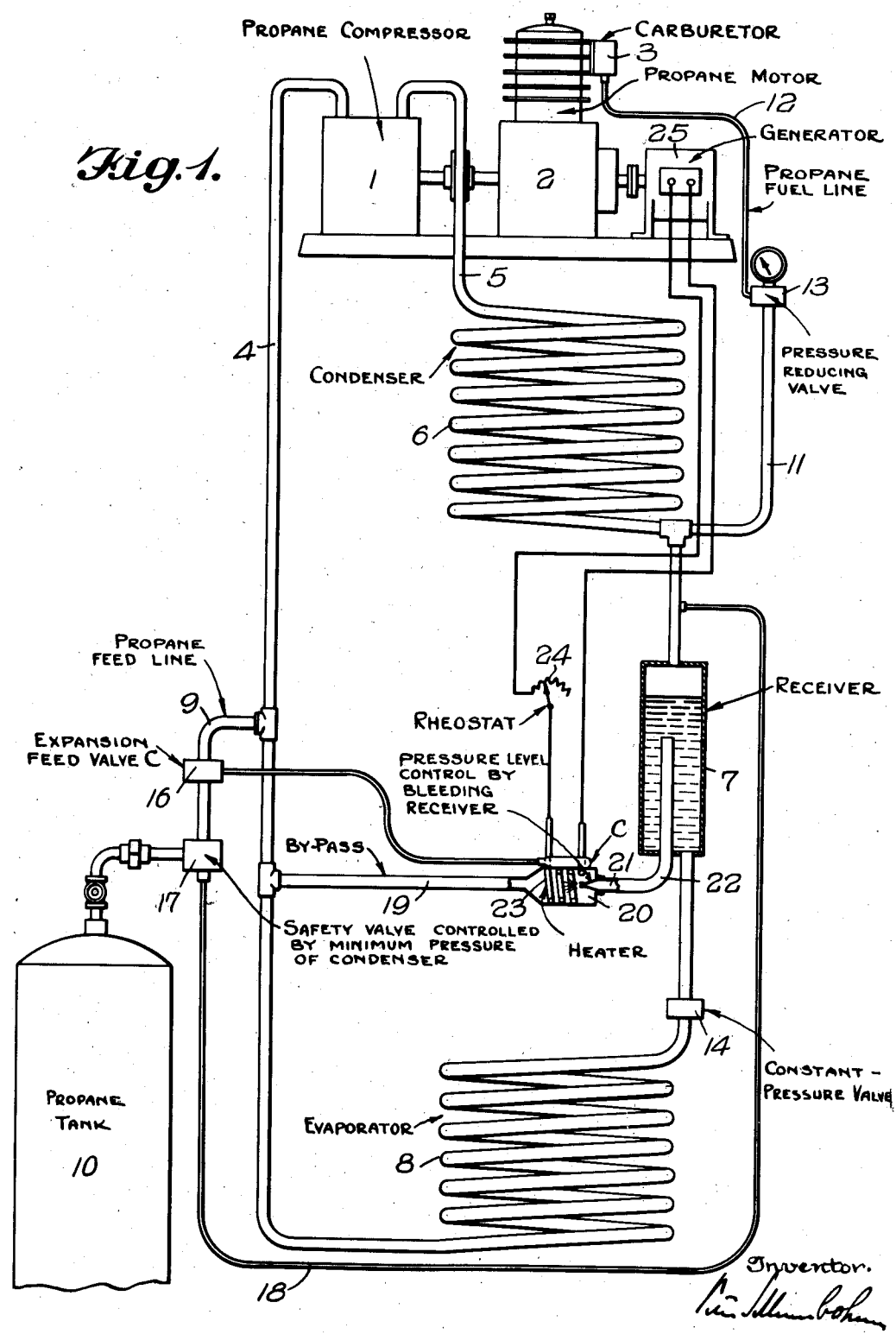

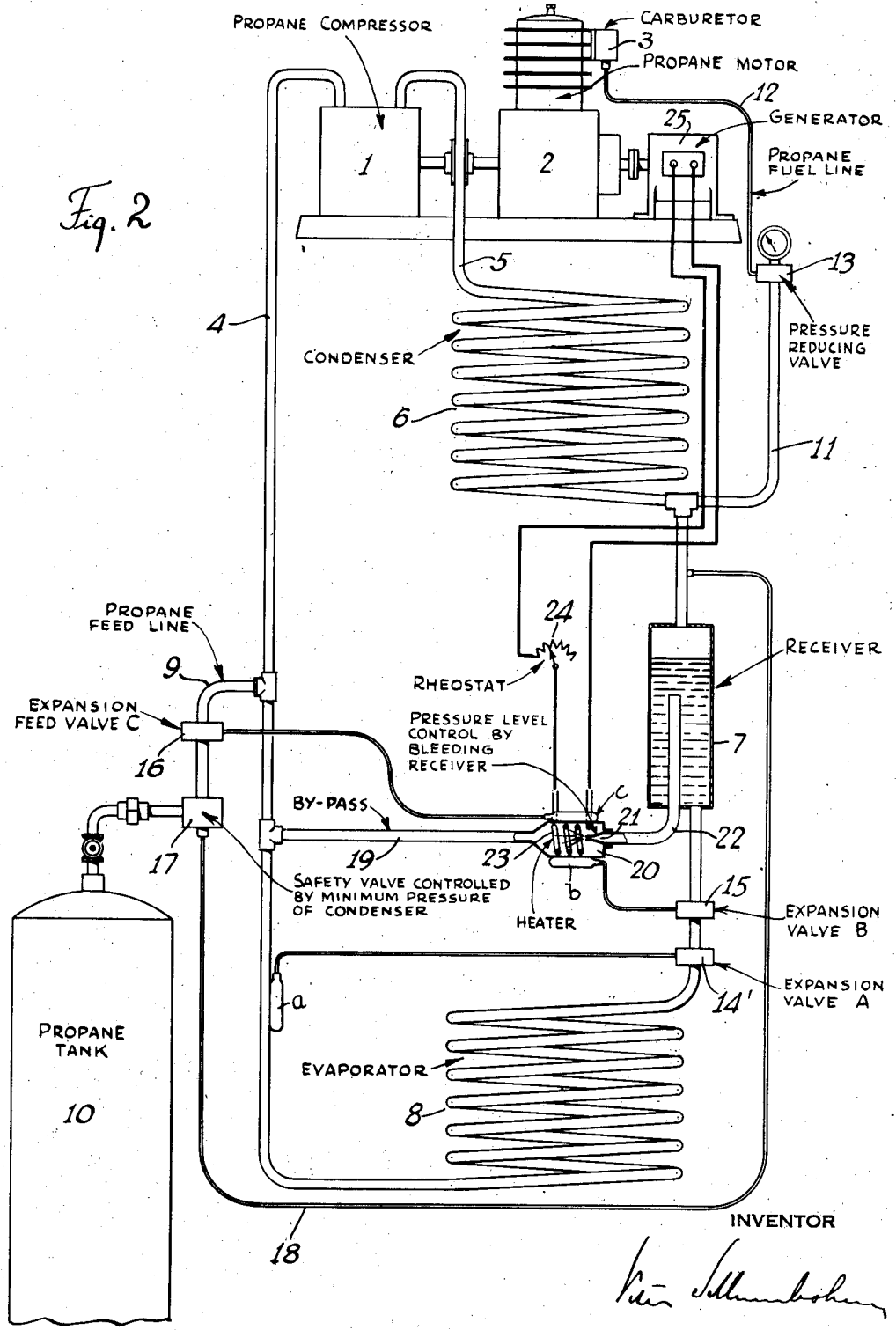

2,195,387

UNITED STATES PATENT OFFICE 2,195,387

AUTOMATIC LEVEL CONTROL

Peter Schlumbohm, New York, N. Y., assignor, by direct and mesne assignments, to Propane Development Corporation, New York, N. Y., a corporation of Delaware Application October 14, 1938, Serial No. 234,911

5 Claims. (Cl. 62—117)

My invention relates to a new method of controlling the flow of a volatile substance and more specifically to a new method of maintaining the liquid level of the volatile substance in a receiver tank, which forms part of the conduit through which the substance flows. In accordance with the invention, the volatility of the substance is utilized to evaporate part of the substance to produce cold, and the thus produced cold is utilized to actuate a differential pressure valve which controls the flow of the substance. At the level to be maintained in the receiver tank, liquid is withdrawn into an evaporator zone. This evaporator zone may be conveniently located at any distance from the receiver tank. By pumping away the vapor of the volatile substance in the evaporator, cold is produced as long as the evaporator is fed with liquid withdrawn from the liquid level in the receiver tank. If liquid is lacking at that level in the receiver tank, the evaporator zone will warm up to atmospheric temperature. These temperature fluctuations in the evaporator zone influence the thermal bulb of a differential pressure valve which controls a conduit through which fresh volatile substance may enter into the receiver tank. The valve will open, if there is not enough liquid in the receiver tank, so that the evaporator zone will not be fed with a liquid and thereby not cool the thermal bulb; and the valve will close if the bulb is cooled by evaporating substance.

The invention is of special importance if the receiver tank is built for high pressure, and without level sight glasses. I anticipate a wide application of my invention, in the chemical industry, in the oil industry, and in the refrigeration industry.

Especially if the level of liquid in a so-called receiver tank is to be controlled, which is connected to condenser equipment to receive the condensate, this new method is valuable. An exact control of the liquid level allows the use of small receiver tanks. Large high-pressure tanks are very expensive.

A very important consequence of my invention is the possibility of operating the condensation process for which the receiver is used, with a minimum of liquid condensate present within the receiver by withdrawing the condensate under precise level control automatically. This reduces the danger factor of the apparatus considerably. In refrigerating equipment, this leads even to a new method of operating a compression cycle and following my invention the amount of circulating liquid refrigerant is kept very small and the system is filled up automatically from a storage tank with refrigerant to make up for loss of refrigerant as caused by leakage or bleeding. The automatic feeding of the system is based on the exact liquid level control as made possible by my invention.

The invention is illustrated by way of example in the accompanying drawings, in which Fig. 1 is a diagrammatic view of a system arranged in accordance with my invention; and Fig. 2 is a view similar to Fig. 1 of a modified system.

The example chosen for explaining the invention is a refrigerating compression system of the type described in my U. S. Patents No. 1,935,749 and No. 2,082,850 in which refrigerant is withdrawn from the cycle to serve as fuel for the motor which drives the compressor. This type of refrigerating system requires a regular refilling with refrigerant and thus offers a better example for the advantages of the invention than closed cycles in which refilling occurs only when required by leakage. Also it resembles more an apparatus for a chemical process—with its feeding to the evaporator end and its tapping from the condenser end. The application of the invention for chemical processes will be evident by the explanation in connection with the drawings. I wish to emphasize that the invention is not limited to refrigerating apparatus but is of general importance as a new principle of level control in the construction of machinery.

In the field of refrigeration, the invention is not restricted to the type of refrigerating system as shown in the drawings, where refilling of the system is required by the tapping of the condenser, but it is of greatest importance for counteracting leakage by an automatic feeding installation. Leakage of refrigerant occurs practically in all refrigerating apparatus which is equipped with a stuffing box, and therefore the application of the invention will have a wide range. The invention may even be applied in the case of refrigerating apparatus without a stuffing box, e. g., in order to measure or to control the level of the liquid refrigerant inside of the apparatus during the filling operation.

In the drawings, the refrigerating system comprises a compressor 1, driven by a motor 2. The suction line 4 of the compressor is connected with a storage tank 10 for fresh refrigerant by a feed line 9. This feed line 9 is controlled by two valves 16 and 17. The valve 17 is a safety valve, which is connected with the condenser 6 and receiver 7 by a line 18, so that the pressure of the condenser will influence the valve 17 in the sense that a minimum pressure, e. g., 100 lbs., in the condenser is required to open the valve 17 and that this valve 17 closes automatically if the condenser pressure sinks below that minimum pressure. This means safety, as the storage tank will be shut off from the feeding line 9, if, for example by breakage of tubing or by strong leakage, the working pressure is not normal. The other valve 16 in the feed line 9 is a valve of the type in which a differential pressure between two pressures is operating the valve, one of the two pressures being produced within thermobulb c. Such thermovalves have been developed especially in the refrigerating industry, and they are obtainable in the market in several varieties: either the valve closes if the thermobulb is warmed or the valve closes if the thermobulb is cooled. The thermal effect required for operating the expansion valve 16 is procured by bleeding refrigerant from the receiver 7 through a capillary jet 21 into an evaporator 20 which is in heat exchange with the thermobulb c of the valve 16. The evaporator 20 is connected with the suction line 4 by the by-pass line 19 to withdraw the vapors of the refrigerant which is evaporated in the small evaporator 20. Only as long as there is liquid refrigerant passing through the jet 21 does absorption of heat take place in chamber 20, and no cooling effect will be created if uncondensed refrigerant fills the receiver at the level from which the jet 21 withdraws. Thus, a thermal effect is procured as a function of the level in the receiver 7, and this thermal effect is utilized to control the level in the receiver in the following manner. The valve 16 opens the feeding line 9 if the thermobulb c is no longer cooled due to a lack of liquid refrigerant in the receiver. Opening the feeding line 9 means that the compressor 1 is pumping refrigerant gas from the storage tank 10, compressing it into the condenser 6 and receiver 7 where condensed liquid refrigerant will collect. When the level of the jet tube 22 within the receiver 7 is reached by the liquid refrigerant, it will overflow into the jet 21, and will produce cold and this in turn will cool the thermobulb c and close the valve 16 in the feeding line 9.

During the period of refilling the receiver with refrigerant from the storage tank 10, the valve in the line between the receiver and the evaporator 8 should be closed. Following my invention, this can be done in two different ways as follows: An expansion valve of the type of a "constant pressure valve" is placed in the line between the receiver 7 and the evaporator 8. This is the simplest way of solving the problem, as this valve will close automatically if the pressure in the evaporator 8 is increased by the opening of feeding line 9. This installation, which is illustrated in Fig. 1 of the drawings, is working very reliably. In the case of propane as refrigerant I may set the constant pressure valve at an evaporator pressure of 55 pounds, corresponding approximately to a temperature of 20° F. of the evaporating refrigerant. The valve will close if the pressure in the evaporator 8 rises above 55 pounds, and this will be the case if the feeding line valve 16 opens the feeding line 9, connecting the evaporator 8 with the storage tank 10 in which at 100° F. a pressure of about 190 pounds exists.

A second way of closing the connection between the condenser-receiver 6, 7 and the evaporator 8 during the period of refilling the system through opening the feeding line 9 is illustrated in Fig. 2 of the drawings. Here an expansion valve 14' may be used which is of the thermal expansion valve type. Following the invention a pilot valve 15 closes the line between the condenser-receiver and the expansion valve 14' if its thermal bulb b is not cooled by evaporating liquid in chamber 20. It must be remembered that without the provision of this pilot valve B the line between the receiver and the evaporator would not be closed as required for the refilling period, as the expansion valve A (14') would not close under the action of increased pressure resulting from the opening of the feeding line 9, as would valve 14 of Fig. 1.

The arrangement of a pilot valve 15 as shown in Fig. 2 involves a thermal bulb b which is in heat exchange with the chamber 20 and is cooled as long as liquid refrigerant passes through jet 21 and is warmed if uncondensed refrigerant vapor enters chamber 20. The valve 15 is set to open the line between the receiver 7 and the main expansion valve 14' only as long as there is liquid refrigerant passing through jet 21.

The latent heat of evaporation for the liquid which leaves the jet 21 may be supplied by the outside air, or by a source of heat as available from the system; e. g., in the case of a refrigerating system the condenser heat may be used. For practical purposes it is sufficient if the bulb regains the temperature of the outside air, and is workable without special provisions for a heat supply. On the other hand, the drawings illustrate a possibility of heating the evaporator zone 20 by means of an electrically heating coil 23. The drawings further illustrate a generator 25 for generating the electric current for the resistance coil 23, and a rheostat 24 for controlling said current.

It is to be emphasized that in industrial plants there is a great want for controlling the level of liquid in large steel cylinders, and that my invention not only serves for the controlling of one level but for the controlling of several levels by providing a bleeding tube 21 at each of the levels in question.

It will be obvious to those skilled in the art that various changes may be made in this device without departing from the spirit of the invention and therefore the invention is not limited to what is shown in the drawings and described in the specification but only as indicated in the appended claims.

I claim:

1. The combination of a storage receptacle for a volatile medium and a consuming device and means for regulating the rate of feeding of the medium from the storage receptacle to said consuming device; said regulating means comprising a compressor, a condenser, a collecting vessel and an evaporator connected in refrigerant flow circuit; means connecting said receptacle with a portion of the circuit; a conduit connecting said consuming device with said collecting vessel and means actuated by changes of phase of the volatile medium in the refrigerating circuit for regulating the rate of withdrawal of the medium from the storage receptacle.

2. The method of maintaining a liquid level of a volatile substance in a receiver tank by regulating the flow of volatile substance in a feeding line carrying additional volatile substance into said receiver tank, comprising withdrawing liquid from said receiver tank at the level which is to be maintained; evaporating the withdrawn liquid in an evaporator zone by pumping away its vapors and thereby producing a cooling effect in said zone, applying said cooling effect to stop the flow of refrigerant in said feeding line and applying the rise in temperature in said zone following the completion of evaporation in said zone to restore the flow of refrigerant through said line.

3. The combination with a receptacle for holding a volatile substance in liquid phase, of means for maintaining a predetermined liquid level within said container; said means comprising a conduit for supplying said substance to said receptacle, a discharge outlet for said receptacle, a second conduit having an inlet at said level and extending from said receptacle and terminating in an outlet outside of said receptacle, an evaporator element at the outlet of the said second conduit; a valve in said supply conduit and means cooperating with said evaporator element to cause heat fluctuations due to the evaporation of liquid discharged from said outlet and cessation of such evaporation to control the valve in said supply conduit.

4. The method of maintaining a liquid level of a volatile substance in a receiver tank, which receives additional liquid volatile substance, by regulating the flow of volatile substance out of said receiver tank, comprising withdrawing a portion of the liquid from said receiver tank at the level which is to be maintained; evaporating the withdrawn portion of liquid in an evaporator zone by pumping away its vapors and thereby producing a cooling effect in said zone; applying said cooling effect to start the flow of another portion of volatile substance out of said receiver tank and applying the rise in temperature in said zone following the completion of evaporation in said zone to stop the flow of volatile substance out of said receiver tank.

5. The combination with a receptacle for holding a volatile substance in liquid phase, of means for maintaining a predetermined level of the liquid in said container; said means comprising a conduit for supplying said substance to said receptacle, a discharge conduit for carrying said substance out of said receptacle, a third conduit having an inlet at said level and extending from said receptacle and terminating in an outlet outside of said receptacle, an evaporator element at the outlet of the third conduit; a valve in said discharge conduit and means cooperating with said evaporator element to cause heat fluctuations due to the evaporation of liquid discharged from said outlet and cessation of such evaporation to control the valve in said discharge conduit.

PETER SCHLUMBOHM.